US008593790B2

(12) United States Patent
Appleton et al.

(10) Patent No.: US 8,593,790 B2

(45) Date of Patent: Nov. 26, 2013

(54) MULTIPLE DISCHARGE DEVICE CASCADING SWITCH AND FUSE DESIGN

(76) Inventors: Randall J. Appleton, West St. Paul, MN (US); Timothy J. Doering, Anoka, MN (US); Aaron Ephraim Bard, Columbia, MD (US)

( * ) Notice: Subject to any disclaimer, the term of this patent is extended or adjusted under 35 U.S.C. 154(b) by 202 days.

(21) Appl. No.: 13/222,405

(22) Filed: Aug. 31, 2011

(65) Prior Publication Data

US 2013/0050907 A1 Feb. 28, 2013

(51) Int. Cl.
*H02B 1/26* (2006.01)
*H01H 85/20* (2006.01)

(52) U.S. Cl.
USPC ........... 361/626; 361/622; 361/625; 361/627; 361/628; 337/186

(58) Field of Classification Search
None
See application file for complete search history.

(56) References Cited

U.S. PATENT DOCUMENTS

| | | | | |
|---|---|---|---|---|
| 2,853,693 | A | 9/1958 | Lindenblad | |
| 4,665,476 | A | 5/1987 | Masuda | |
| 5,019,937 | A * | 5/1991 | Beard | 361/102 |
| 5,045,733 | A * | 9/1991 | Sendelweck | 327/308 |
| 5,054,029 | A | 10/1991 | Sugawara et al. | |
| 5,640,293 | A | 6/1997 | Dawes et al. | |
| 6,018,452 | A * | 1/2000 | Meyerhoefer et al. | 361/111 |
| 7,400,493 | B2 * | 7/2008 | Ewing et al. | 361/623 |
| 7,983,024 | B2 * | 7/2011 | Harris, IV | 361/629 |
| 8,289,123 | B2 * | 10/2012 | Whitney et al. | 337/295 |
| 2006/0071640 | A1 | 4/2006 | McCool et al. | |
| 2008/0067980 | A1 | 3/2008 | MacDougall | |

* cited by examiner

*Primary Examiner* — Boris Chervinsky

(74) *Attorney, Agent, or Firm* — Patterson Thuente Pedersen, P.A.

(57) ABSTRACT

A device and method of use of a multiple discharge panel for a multiple-discharge, high energy electric device. The device generally uses a panel for a multiple-discharge, high energy electric device that includes a plurality of fuse assemblies constructed in a cascading arrangement in a common panel. Each fuse assembly provides protection from a single high energy discharge pulse and includes a structure defining a cavity. The fuse assembly further contains a resistor made of components that explode when subjected to a large pulse of power to temporarily interrupt and dissipate the large pulse of power. The structure defining the cavity is shaped to deform in response to explosion of the resistor such that a new connection to a remaining one of the plurality of fuse assemblies is established.

15 Claims, 7 Drawing Sheets

MULTIPLE DISCHARGE DEVICE CASCADING SWITCH AND FUSE DESIGN

This invention was made with Government support under U.S. Government Contract W911QX-08-C-0077, awarded by U.S. Army Contracting Command. The government has certain rights in the invention.

FIELD OF THE INVENTION

The present invention relates to switch and fuse designs. More particularly, the present invention relates to multiple discharge devices having cascading switch and fuse designs for extremely high voltage and high current pulse power applications.

BACKGROUND OF THE INVENTION

In recent years, there has been considerable improvement in the area of pulsed power research, which involves the storing, shaping, and performance of high energy density capacitors used in pulsed power applications. These pulsed power applications may require extremely high discharges of voltage and current. For example, discharges of high voltages in the 10 kV or more range and high current in the 150 kA or more range have been proposed. Historically, high-energy electrical devices for pulsed power applications have been limited to a single discharge. Any subsequent discharges would require a time-intensive rebuilding and replacement of components before a second high energy discharge could take place. Repeatability of high energy discharges in the high power range in a short amount of time has been considered difficult or impossible to achieve based upon the extreme environment created by such discharges.

Therefore, what is needed is a switch and fuse device which overcomes the deficiencies of the past, and which enables multiple, high-voltage, high-current discharges of pulsed power in a short timeframe.

SUMMARY OF THE INVENTION

The present invention overcomes the problems of the prior art by providing a device and method allowing for multiple discharges of pulsed power from a high energy electric device in a short amount of time. Specifically, an electrical protection panel including a cascading switch and fuse design is provided for use with a high energy electrical device. A method for using the cascading fuse and switch design to safely provide pulsed power is provided as well.

One embodiment includes a device for a multiple-discharge, high energy electric device that includes a plurality of fuse assemblies constructed in a cascading arrangement. Each fuse assembly provides protection from a single high energy discharge pulse and includes a structure defining a cavity. Each individual fuse assembly further contains a resistor made of components that explode when subjected to a large pulse of power to temporarily interrupt and dissipate the large pulse of power. The structure defining the cavity is shaped to deform in response to explosion of the resistor such that a new connection to a remaining one of the plurality of fuse assemblies is established.

In another embodiment, a device design for a multiple-discharge, high energy electric device is provided. In this design, a device including a plurality of fuse assemblies is constructed in a cascading arrangement in a common device where each of the fuse assemblies provides protection from a single high energy discharge pulse. Each of the fuse assemblies includes a portion of a housing structure defining a cavity within the device. Each of the fuse assemblies also includes a section of a copper plate mounted adjacent the cavity having perforated portions proximate the cavity comprised of elongate slits located about and across the perimeter of the cavity. The perforated portions are shaped to provide a designated area with increased propensity for localized deformation. Additionally, each fuse assembly has a resistor mounted within the cavity where the resistor has components designed for a moderate amount of power. The resistor is further designed to fail and explode when subjected to a high energy discharge pulse of power. Also, each fuse assembly includes a contact plate coupled to an unused fuse assembly with one or more protrusions providing contact features in close proximity to the perforated portion.

In another embodiment according to the present invention, a device for a cascading switch is included. The device includes a plurality of plates and housing panels disposed in an adjacent, stacked configuration. The plates and housing panels include a first housing panel containing a plurality of spaced-apart, cavities disposed across the length of the first housing panel. The plurality of plates and housing panels also include a second housing panel containing spaced-apart passageways disposed across the length of the second housing panel at a spacing corresponding to the cavities of the first housing panel. Also included is an interior plate located between the first housing panel and the second housing panel and containing perforated portions at locations adjacent the various corresponding cavities and passageways of the first and second housings. The perforated portions each utilize elongate slits that define and upper and a lower flap. Additionally, a perimeter plate is included which is located against a second surface of the first housing panel. The device includes a plurality contact plates with one or more protrusions for contact disposed on the second housing panel adjacent the spaced-apart passageways. The device further has a plurality of resistors, each connected between a front contact plate and interior plate and housed within one of said cavities in the first housing panel. The resistors are comprised of components for shaping pulsed power passing therethrough and for exploding when subjected to sufficiently high power pulses to deform the interior plate to contact and complete an electrical circuit with a further resistor or circuitry within the panel.

According to an embodiment of the present invention, a method is set forth for providing a large amount of pulsed power without electrically damaging a pulsed power device. Specifically, this method includes coupling a device having a cascading switch and fuse design to the pulsed power device. The device having a plurality of fuse assemblies in a cascading arrangement and each fuse assembly having a resistor, a designated deformable portion of a copper plate mounted next to the resistor, and at least one contact location adjacent the deformable portion of the contact plate. Only a first fuse assembly of the plurality of fuse assemblies is initially configured in a closed circuit configuration. The method further includes providing a large pulse of power to the first fuse assembly of the device to cause an explosion of the resistor to temporarily interrupt the circuit, dissipate the large pulse of power, and deform the copper plate to close the circuit of one of the remaining fuse assemblies for subsequent use.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE PREFERRED EMBODIMENTS

The invention may be embodied in other specific forms without departing from the essential attributes thereof, therefore, the illustrated embodiments should be considered in all respects as illustrative and not restrictive.

In various embodiments of this invention an apparatus and method are disclosed for a cascading switch and fuse panel having a cascading switch and fuse design. The cascading switch and fuse "panel" should also be understood to refer to a "device" and may be referred to as a device interchangeably in the various embodiments described and claimed, at times, throughout this application. The panel disclosed is designed to allow for protection from multiple discharges of pulsed power from a high energy electric device in a short period of time.

Figure 1:
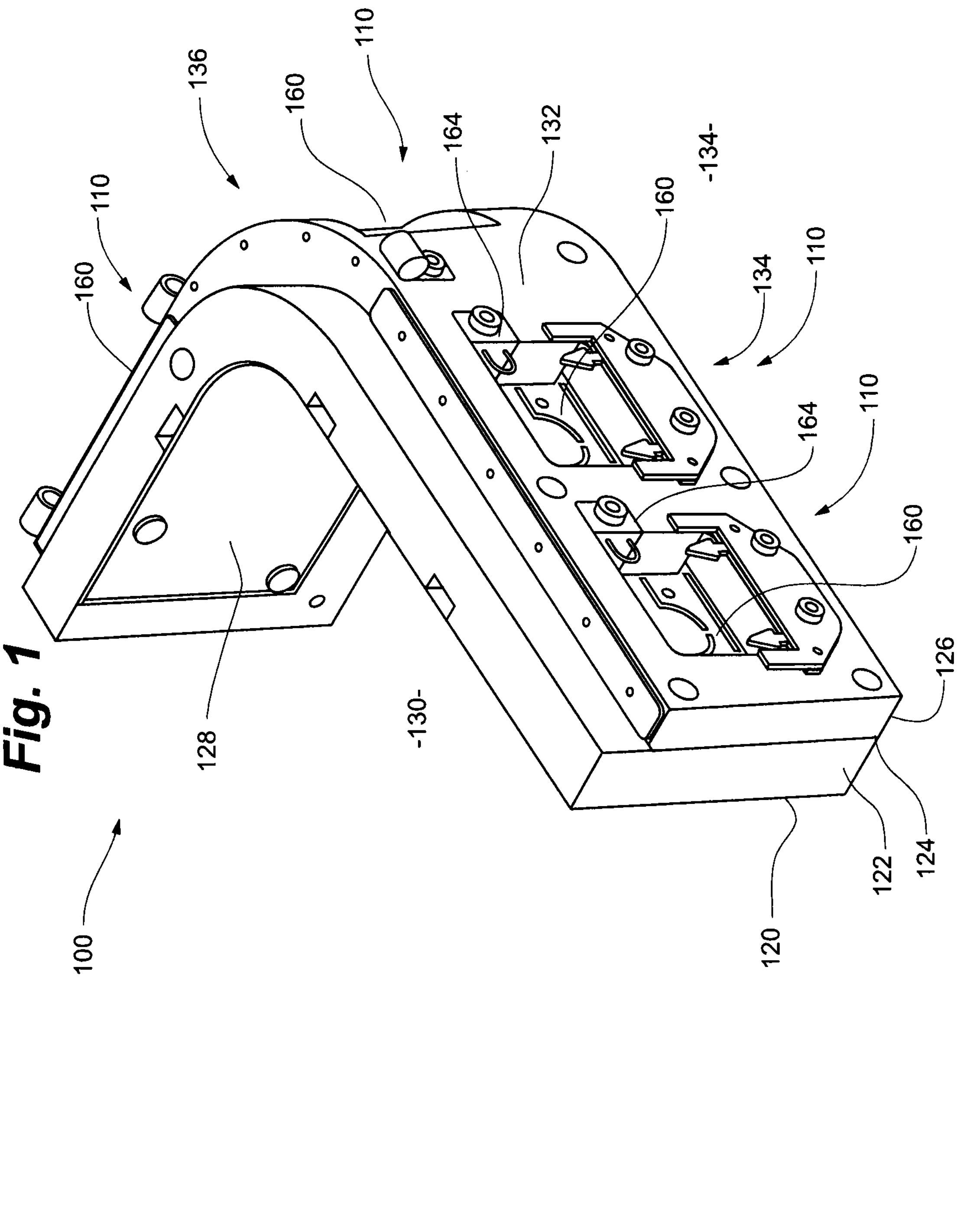
FIG. 1 illustrates generally a cascading switch and fuse device.
Figure 2:
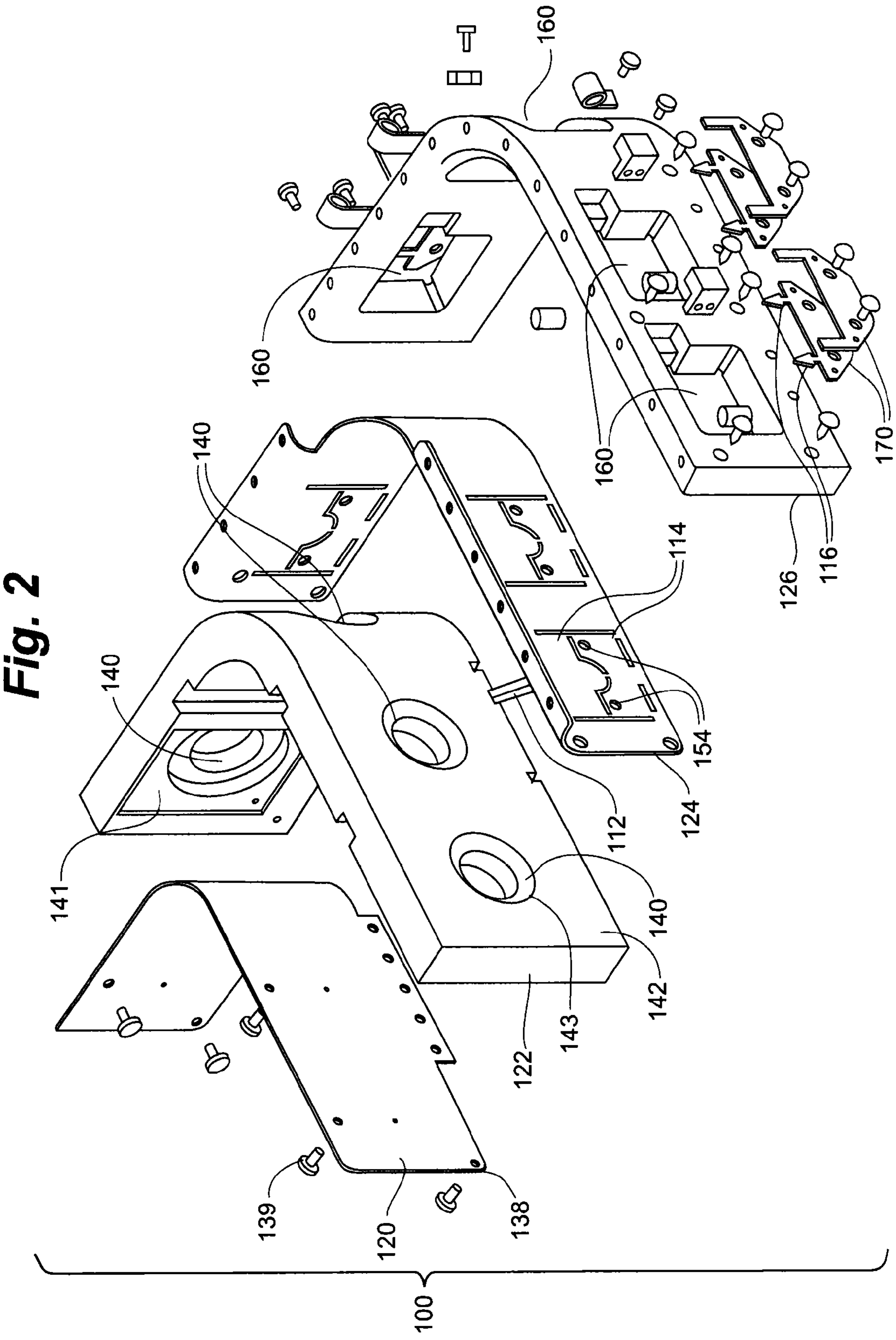
FIG. 2 illustrates generally an exploded view of a cascading switch and fuse device according to an embodiment of the invention.
Figure 3:
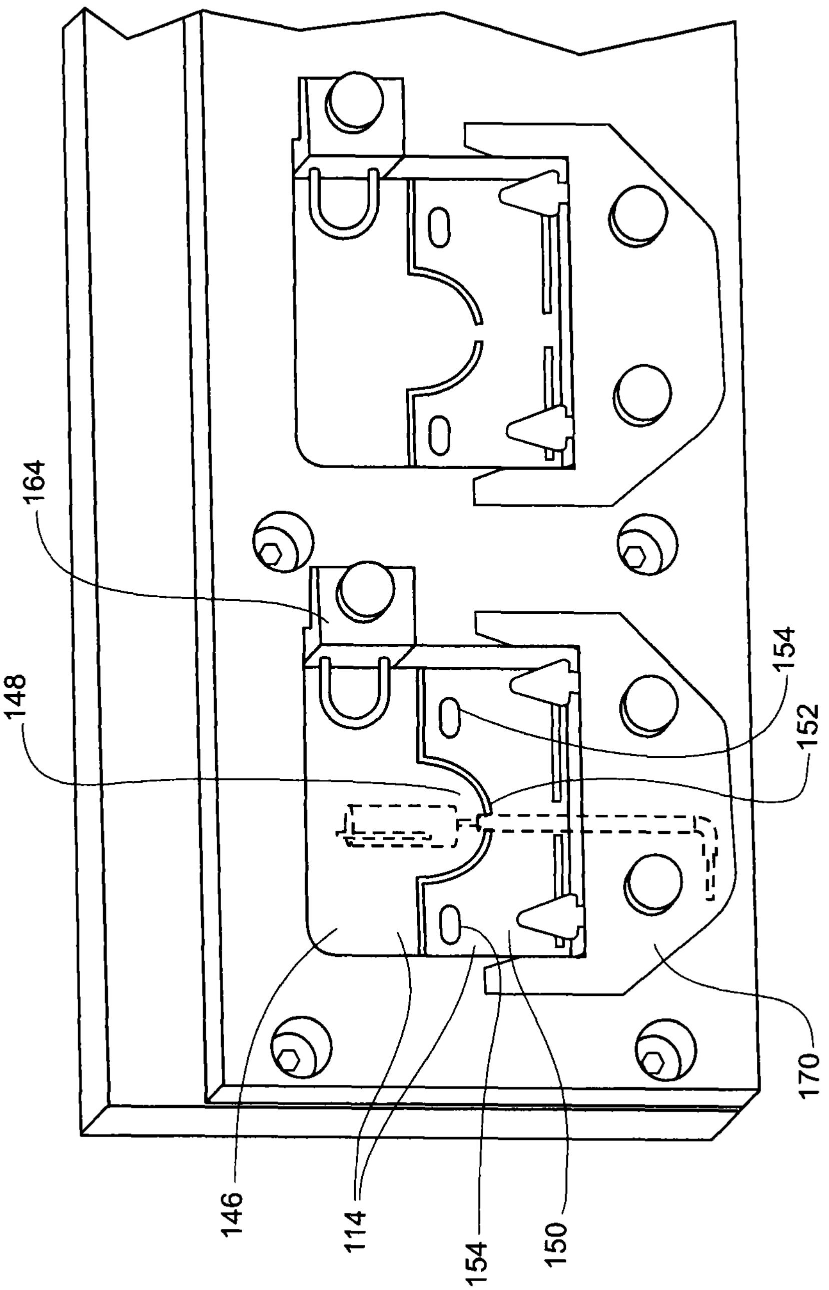
FIG. 3 illustrates generally a partial front perspective view of two fuse assemblies of the cascading switch and fuse device according to an embodiment of the invention.
Figure 4:
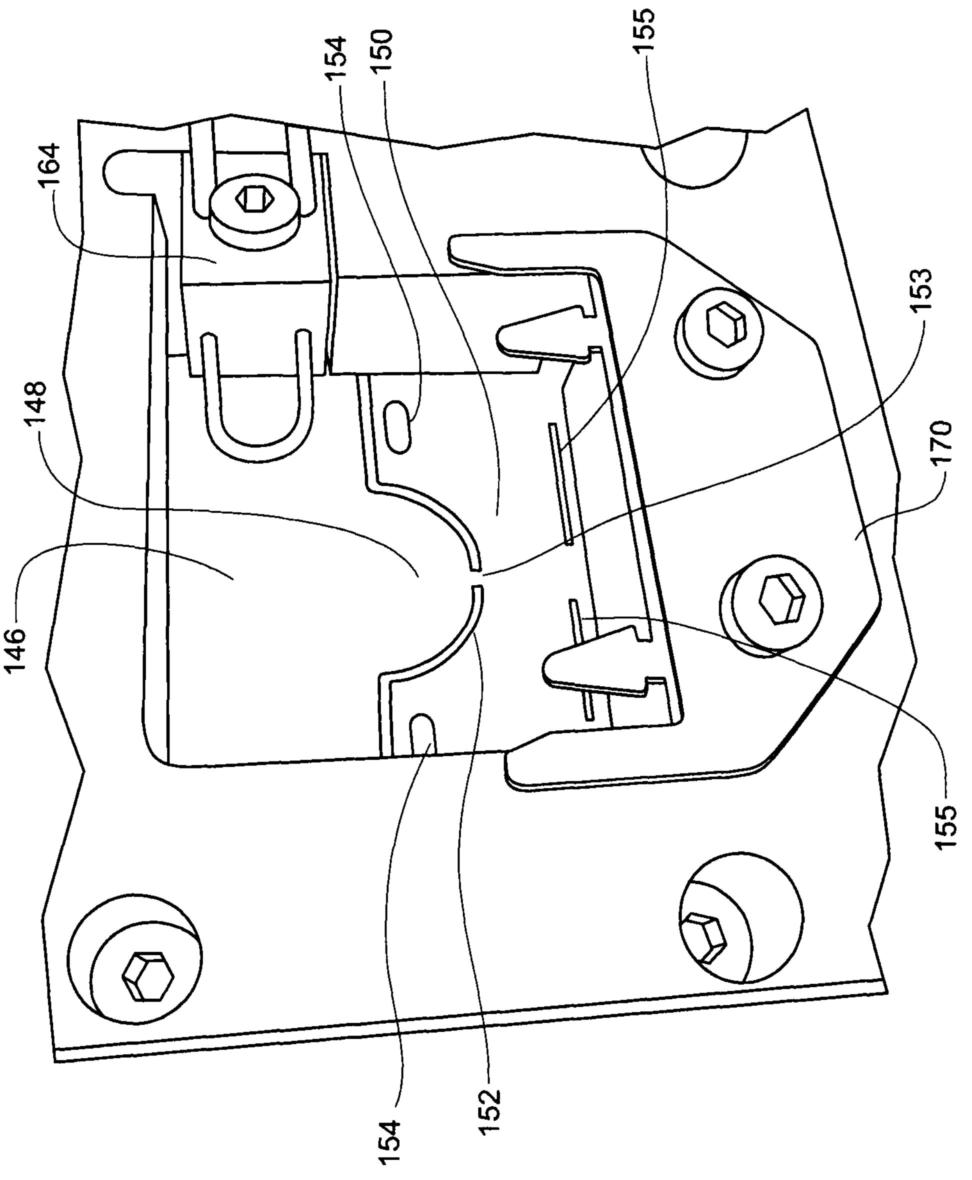
FIG. 4 illustrates generally a perspective view of a fuse assembly of the cascading switch and fuse device prior to explosion of the fuse assembly resistor according to an embodiment of the invention.
Figure 5:
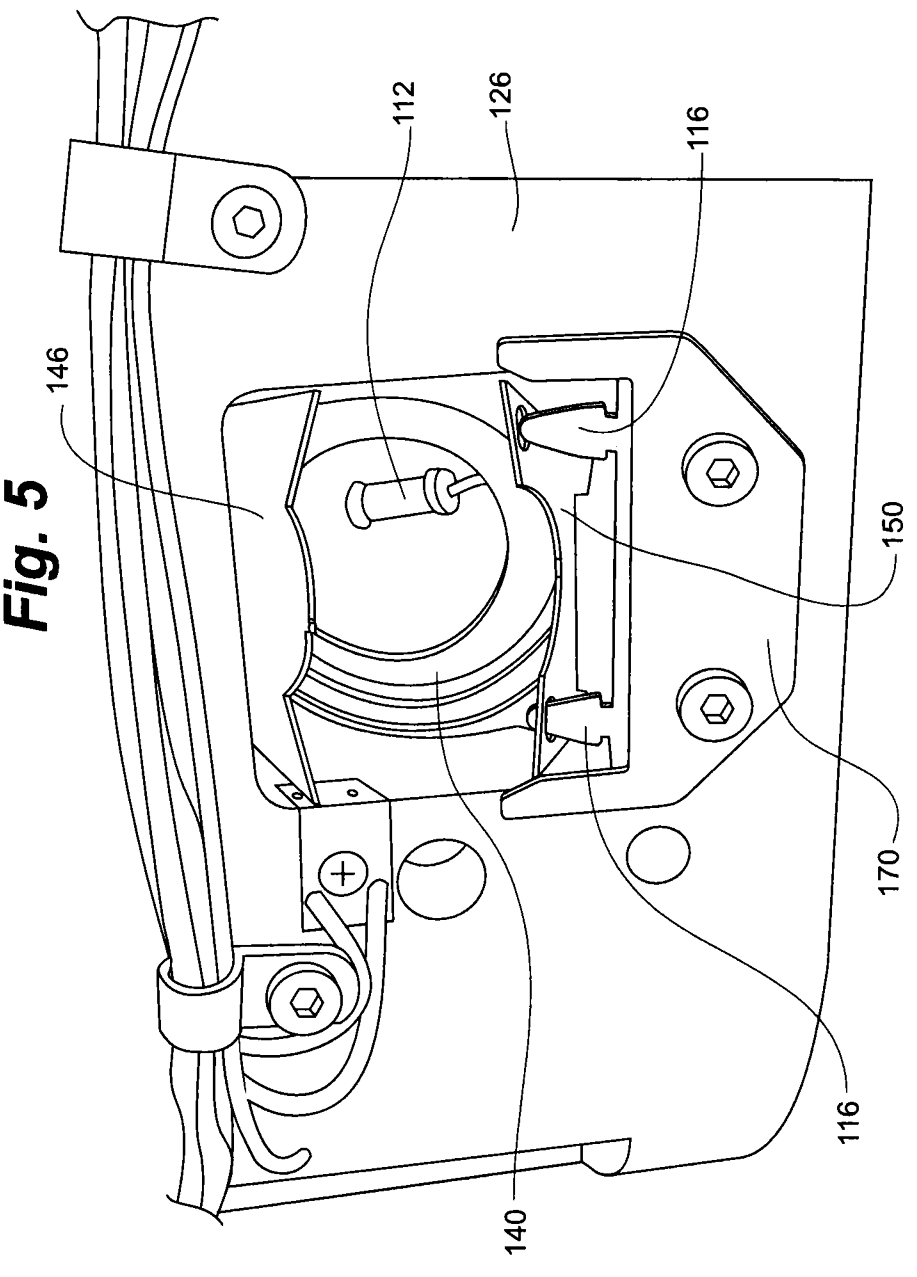
FIG. 5 illustrates generally a perspective view of a fuse assembly of the cascading switch and fuse device after the resistor of the fuse assembly has exploded according to an embodiment of the invention.

In general, the cascading switch and fuse panel/device 100 can be largely understood from FIGS. 1 and 2. FIG. 1 shows an example of a cascading switch and fuse panel 100 in an assembled configuration and FIG. 2 shows an exploded view of the panel and panel components. The panel 100 depicted is an elongate structure including multiple elongate conductive plates and non-conductive housing panels of material stacked in adjacent side-by-side relation to one another. Further, incorporated as a part of the panel 100 are a plurality of spaced-apart fuse assemblies 110 which utilize a combination of components including resistors 112, perforated panels 114 (also referred to at times as perforated plate portions 114) and spear-shaped contacts 116. These fuse assemblies 110 are arranged together in a functioning relationship, and cooperate to provide a panel with a cascading switch and fuse design.

As seen in FIG. 2, the panel 100 has four large structural panel components, namely, a perimeter plate 120, a first housing panel 122, an interior plate 124, and a second housing panel 126. When assembled, the plates and panels are combined and are generally disposed between a first major face 128 at side 130 of the panel 100 and a second major face 132 at side 134 of the panel 100. In the embodiment shown, the plates and housing panels each have a radiused bend 136 and are accordingly stacked adjacent one another around this corresponding shape. A bended shape may be used in certain specific discharge devices, however, the shape is not critical to the function of the panel and accordingly, the panel 100 may be flat or otherwise shaped to appropriately suit a particular device or application.

The perimeter plate 120 is generally made of metal or other conductive material and has a flat or radiused surface that corresponds to the adjacent first housing panel 122. The perimeter plate 120 is largely one continuous plate that is largely isolated from interior plate 124. Perimeter plate 120 includes connections leading to a plurality of resistors 112 at discrete spaced apart locations along the panel 100. The plate 120 further has a plurality of apertures 138 that may be used with various connectors 139 for holding the plate 120 and the remainder of the panel 100 together.

The first housing panel 122 is a structure having spaced-apart centrally disposed cavities 140 across its length. In FIGS. 1-5, these cavities 140 are shown as apertures defined by cylindrical passageways extending from one primary face 141 to the opposite primary face 142 of the first housing panel 122. The passageways provided by cavities 140 further have cylindrical depressions 143 that encircle the perimeter of the central passageway but do not extend all the way through the panel 122. Resistors for the cascading circuit are located within these cavities 140, where each cavity 140 contains a single resistor 112.

The interior plate 124 is a plate made of copper or other conductive material and has a flat or radiused surface similar to that of the perimeter plate 120. At spaced-apart locations across the plate 124, portions of the plate are perforated such that perforated panel members 114 are defined. The perforated panel members 114 should be considered perforated portions of the interior plate 124. These perforated portions are comprised of a number of elongate slits. These slits are located about and across a somewhat square section of the plate 124. The perforated panel members 114 are formed at locations aligned with the cavities 140 of the adjacent first housing panel 122 roughly about and across the perimeter of these cavities 140. The perforated panel members 114 define an upper flap portion 146 which is largely rectangular but which contains a semicircular projecting tab 148 extending from its lower edge and a lower flap portion 150 of largely rectangular shape which contains a semicircular recess 152 within the upper edge in mating relation to the projecting tab 148. The upper flap and lower flap portions are defined for bending away from a cavity 140 in response to an explosion of an adjacent resistor.

Although the upper and lower flap portions 146 and 150 are largely separated by a gap formed of elongate slits, the gap is not continuous and contains segments of material as at 153 that ensure the two flaps are held in place. Further, perforations 155 are located along the bottom edge of the flap 150 such that bending and deformations of the flap are subject to occur based on these perforations. The lower flap 150 contains oval shaped apertures 154 near its upper edge, adjacent both sides of the semicircular recess 152. The shapes of the perforated panel members 114 are intended to allow for predictable deformation, particularly with respect to the lower flap and oval shaped apertures. Although the configuration shown in the Figures is known to provide such predictable deformation, additional shapes may be used to define the perforated panel members 114.

The second housing panel 126 is a further non-conductive housing structure of the panel that abuts against the interior plate 124 when the panel 100 is assembled. The second housing panel 126 contains spaced-apart, centrally disposed passageways 160 across the length of the second housing panel 126 with spacing similar to that of the cavities 140 that are disposed across the first housing panel 122. The passageways 160 are shown as square passageways, although the possibility of passageways of other shapes and sizes is contemplated as well. The passageways 160 are aligned such that they correspond to the perforated panels 114 of the interior plate 124. Further, sensors 164 may be located in the interior wall of passageways 160 adjacent the opening provided by these passageways. Such sensors 164 may be used to measure one or more parameters related to the particular fuse assembly 110 or to indicate the operational status of the assembly 110. Examples of such sensors are discussed in copending patent application of Ser. No. 13/222,420 by Doering et al., titled MULTIPLE DISCHARGE DEVICE PANEL FIBER OPTIC FUSE STATE INDICATOR, which is hereby incorporated by reference in its entirety.

The outward face of the second housing panel 126, also referred to as the second major face 132 of the panel 100, further contains a plurality contact plates 170 with one or more protrusions for contact such as spear-shaped contacts 116. Various other shaped protrusions or contact features may be used as part of the contact plates disclosed and should be incorporated within the embodiments disclosed and described in this application. These plates 170 and contacts 116 may be separate components or integrally formed components. The spear-shaped contacts 116 of the plates each project upwardly in a converging manner at the ends of the plates 170. When the plates 170 are mounted on the panel 126, the spear-shaped contacts extend near each of the lower corners of the passageways 160. The contacts 116 are aligned with, but spaced apart from the apertures 154 in the perforated panels 114 of the interior plate 124 when in the assembled state shown in FIGS. 1, 3, and 4, for example. Projections of shapes other than spears for contacts as part of the contact plates 170 are possible. Likewise, coupling interactions other than those between spear-shaped contacts and apertures, such as latches or other well-known coupling components are contemplated by this disclosure as well.

Although in an open circuit configuration, the contact plate 170 of the fuse assembly 110 is connected to a second resistor 112 of another fuse assembly within a cavity 140. That resistor 112 then further contains a connection with perimeter plate 120. This connection between the contact plate 170, the second resistor 112, and the perimeter plate 120 largely cannot be seen in the Figures, as it is made possible by insulated wiring passing through an aperture in the body of the second panel housing 126. This arrangement of electrical components, however, can be understood from the circuit diagram in FIG. 6. Accordingly, the second resistor 112 and associated components are part of the second fuse assembly of the panel which is further connected in a cascading arrangement to further fuse assemblies.

Accordingly, the assembled panel 100 set forth in FIG. 1 can be understood to generally refer to a panel that is equipped with a plurality of fuse assemblies 110 that are connected in a cascading arrangement. The four fuse assemblies 110 shown in the figures have been labeled 110*a*, 110*b*, 110*c*, and 110*d* in order of their cascading use. The corresponding components of each assembly will be referred to with a nomenclature of "a", "b", "c" or "d" denoting the fuse assembly each part is associated with for convenience as well.

Prior to use of the panel, of the four fuse assemblies 110*a*, 110*b*, 110*c*, and 110*d*, only fuse assembly 110*a* and its resistor 112*a* provides a continuous connection between the power source and discharge device. Specifically, this provides a connection between the perimeter plate 120 and the interior plate 124 in the panel. The three remaining fuse assemblies 110*b*, 110*c*, and 110*d* are not connected and the resistors 112*b*, 112*c*, and 112*d* are initially in open circuit configuration.

Operation of the panel 100 begins when a large pulse of power is experienced by the panel. First, the discharge device short circuits and current begins to flow through the first fuse assembly 110*a*. As the current builds, the energy is enough to explode the resistor 112*a* in the first fuse assembly, essentially turning it into a fuse. The exact values of the exploding resistor being dependent upon the delay required. This explosion does two things. First, it provides the required delay in the pulse required by the multiple discharge device system. Second, the pressure it creates causes the perforated plates 114*a* to deform along the preformed features, such that the lower flap 152 bends along the partial elongated slits at its lower perimeter and causes apertures 154 to be forced down around and against the two spear-shaped contacts 116*a* in a locked configuration. An example of this resulting configuration can be seen in FIG. 5, for example. The locking completes the circuit for the next fuse assembly 110*b* which is now continuous. Thereafter, when a subsequent large pulse of power is experienced by the panel, the process is repeated by fuse assembly 110*b* and the fuse assemblies 110*c* and 110*d* for subsequent pulses.

Figure 7:
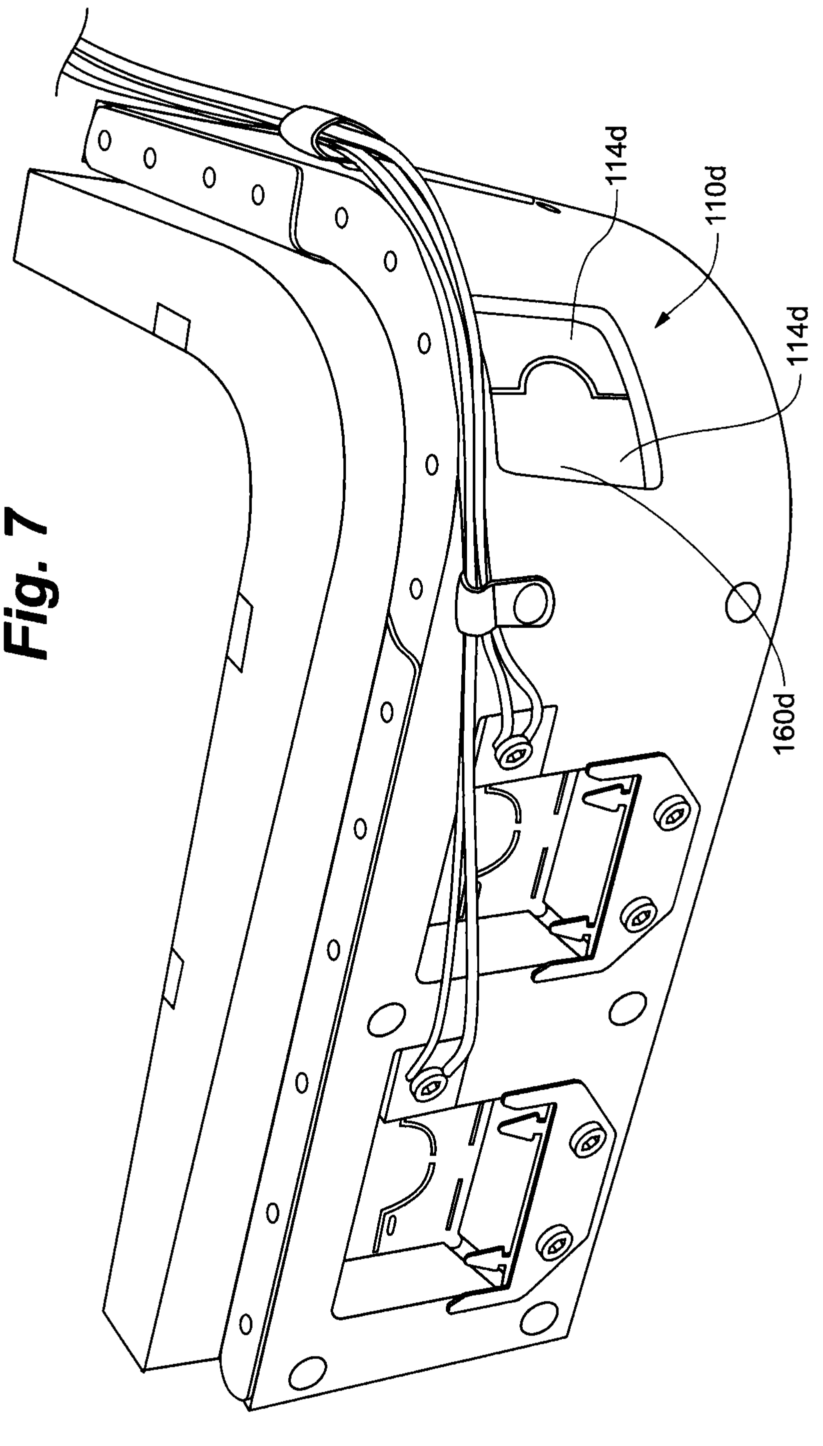
FIG. 7 illustrates generally an assembled cascading switch and fuse device from another perspective view.

The final fuse assembly 110*d* is slightly different, however, as it is the last fuse on the panel. Accordingly, the last fuse does not have spear-shaped contacts for completing the circuit, but rather disconnects the circuit until the entire panel can be replaced. The location and arrangement of this last fuse assembly 110*d* can be seen in FIG. 7. FIG. 7 generally depicts the assembled panel 100 from a slightly different front view. In this Figure, the fuse assembly 110*d* is shown oriented somewhat differently than the other assemblies. Namely, the perforated panels 114*d* are split vertically from top to bottom by elongated slits, rather than horizontally from side to side. Accordingly, when the resistor 112*d* explodes, the flaps of the perforated panels 114 will fold out against the sides of the passageway 160*d*.

Note that the resistors 112 used in this panel are generally intended to be nominal resistors of the type typically used in electrical circuit designs of moderate power. Such moderate power is on a scale far less than the type of large pulses of power discussed in this application. In general, no specialized exploding components are necessary to carry out the explosions required for this design as the large pulses of power are large enough to generate a reliable explosion when introduced to one of the resistors 112.

Figure 6:
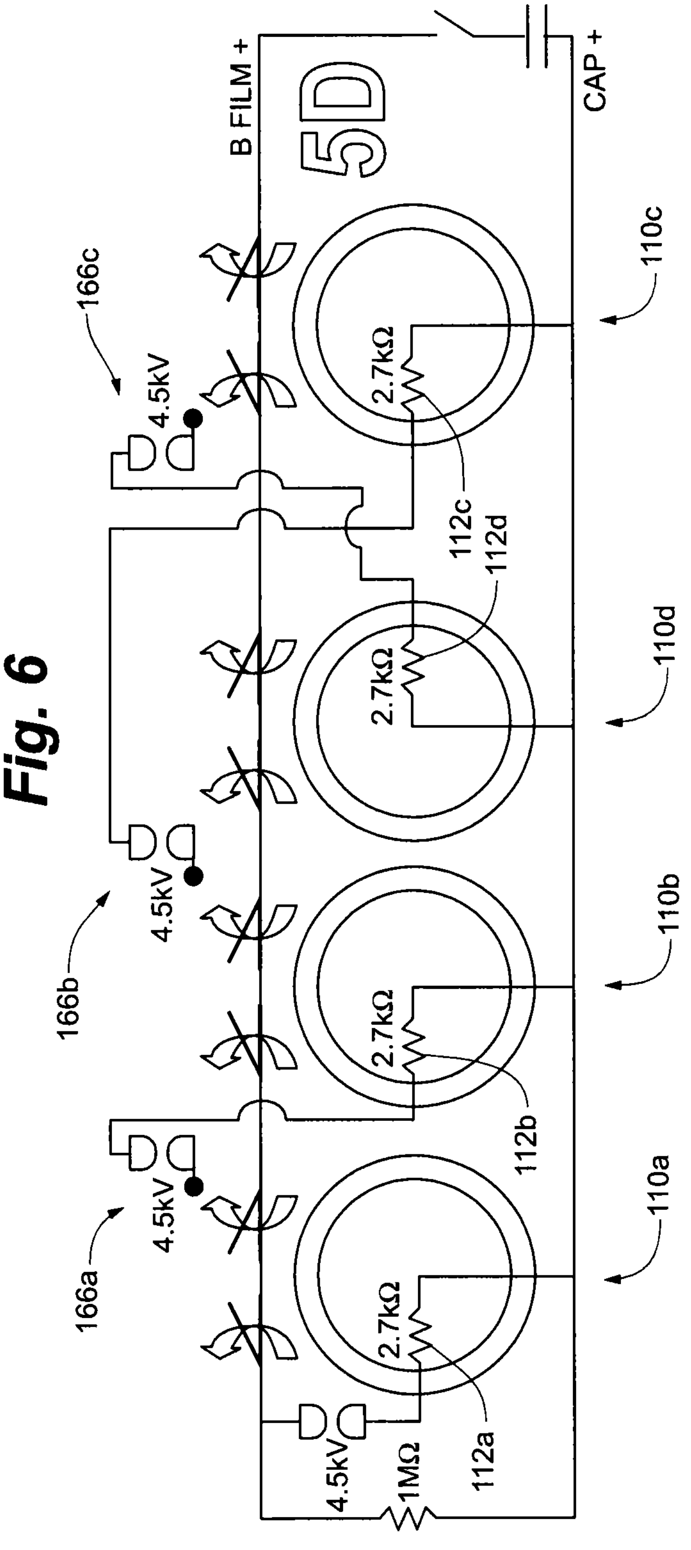
FIG. 6 illustrates generally a circuit diagram of the cascading circuit of the cascading switch and fuse device, according to an embodiment of the invention.

FIG. 6 discloses a circuit diagram of the cascading circuit of the panel. The circuitry associated with each of the four fuse assemblies 110*a*, 110*b*, 110*c*, and 110*d* is denoted as well as their corresponding resistors 112*a*, 112*b*, 112*c*, and 112*d*. Further, switches 166*a*, 166*b*, and 166*c* are shown which represent the connection of the perforated panels 114 and the respective spear-shaped contacts 116. Note that the fourth fuse assembly 110*d* is placed between the second and third fuse assemblies 110*b* and 110*c* as the assemblies are not disposed in sequential order within the panel.

Accordingly, a cascading fuse and switch design is provided in this embodiment where damage to a device from four different pulses of power can be independently shielded by these fuses. Moreover, the cascading arrangement allows each subsequent fuse to be available within seconds of use of the previous fuse.

Other methods associated with use of the device described in this application may further include method for providing a large amount of pulsed power without electrically damaging a pulsed power device. This method includes coupling a panel 100 having a cascading switch and fuse design to the pulsed power device. In this method, the panel has a plurality of fuse assemblies 110 in a cascading arrangement. Each fuse assembly has a resistor 112, a designated deformable portion of a copper plate 124 mounted next to the resistor, and at least one contact location adjacent the deformable portion of the contact plate. Only a first fuse assembly of the plurality of fuse assemblies 110 is initially configured in a closed circuit configuration. Devices such as those described throughout the above specification and figures may be coupled to any variety of devices which are capable of discharging a large amount of pulsed power. The method further includes providing such a large pulse of power to the first fuse assembly of the panel. Providing such a large pulse of power will to cause an explosion of the resistor to temporarily interrupt the circuit, dissipate the large pulse of power, and deform the copper plate to close the circuit of one of the remaining fuse assemblies 110 for subsequent use. Accordingly, it is possible to provide a substantial amount of pulsed power, yet to avoid electrical damage to associated electronic circuitry. Providing additional larger pulses of power is also made possible by this arrangement and method.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A panel for a multiple-discharge, high energy electric device, comprising:
- a plurality of fuse assemblies constructed in a cascading arrangement in a common panel, each fuse assembly providing protection from a single high energy discharge pulse and includes:
  - a housing structure defining a cavity within the panel;
  - a copper plate mounted adjacent the cavity having a perforated portion proximate the cavity comprised of elongate slits located about and across the perimeter of the cavity, the perforated portion shaped to provide a designated area with increased propensity for localized deformation;
  - a resistor mounted within the cavity, the resistor having components designed for a moderate amount of power and explosion when subjected to a high energy discharge pulse; and
  - a contact plate coupled to an unused fuse assembly, the contact plate having one or more protrusions in close proximity to the perforated portion.

2. The panel of claim 1, wherein the perforated portion defines an upper flap and a lower flap for bending away from the cavity in response to an explosion of the resistor.

3. The panel of claim 2, wherein the lower flap contains oval shaped apertures for contact with the one or more protrusions of the contact plate.

4. The panel of claim 1, wherein at least three fuse assemblies are located in the common panel.

5. The panel of claim 1, wherein the copper plate is common to each of the fuse assemblies and contains perforated portions for each of the plurality of fuse assemblies.

6. The panel of claim 1, wherein the panel is designed to handle pulses having voltages in the 10 kV or more range and current in the 150 kA or more range.

7. A panel for a cascading switch comprising:
- a plurality of plates and housing panels disposed in an adjacent, stacked configuration including:
  - a first housing panel containing a plurality of spaced-apart cavities disposed across the length of the first housing panel;
  - a second housing panel containing spaced-apart passageways disposed across the length of the second housing panel at a spacing corresponding to the cavities of the first housing panel;
  - an interior plate located between the first housing panel and the second housing panel containing perforated portions each utilizing elongate slits that define an upper flap and a lower flap at locations adjacent the corresponding cavities of the first housing panel and passageways of the second housing panel;
  - a perimeter plate located against a second surface of the first housing panel;
- a plurality of resistors, each connected between a front contact plate and the interior plate and housed within one of the cavities of the first housing panel;
- a plurality contact plates with one or more protrusions disposed on the second housing panel adjacent the spaced-apart passageways;
- wherein said resistors are comprised of components for shaping pulsed power passing therethrough and for exploding when subjected to sufficiently high power pulses to deform the interior plate to contact and complete an electrical circuit with a further resistor or circuitry within the panel.

8. The panel of claim 7, wherein the lower flaps of the perforated portions are adapted to bend in an outwardly directed manner away from the cavity in response to an explosion of the resistor located therein.

9. The panel of claim 8, wherein the lower flap contains oval shaped apertures positioned for contact with the one or more protrusions of the contact plate when the lower flap is deformed.

10. The panel of claim 7, wherein the panel provides an assembly that provides protection from at least three discharges of pulsed power.

11. The panel of claim 7, wherein the copper plate contains the perforated portions for each of the plurality of fuse assemblies of the common panel.

12. The panel of claim 7, wherein the panel is design to handle pulses having voltages in the 10 kV or more range and current in the 150 kA or more range.

13. A method for providing a large amount of pulsed power without electrically damaging a pulsed power device, comprising the steps of:
- coupling a panel having a cascading switch and fuse design to the pulsed power device, the panel having a plurality of fuse assemblies in a cascading arrangement, each fuse assembly having a resistor, a designated deformable portion of a copper plate mounted next to the resistor, and at least one contact location adjacent the deformable portion of the contact plate, wherein only a first fuse assembly of the plurality of fuse assemblies is initially configured in a closed circuit configuration;

providing a large pulse of power to the first fuse assembly of the panel to cause an explosion of the resistor to temporarily interrupt the circuit, dissipate the large pulse of power, and deform the copper plate to close the circuit of one of the remaining fuse assemblies for subsequent use.

14. The method of claim 13, wherein the panel includes at least two fuse assemblies.

15. The method of claim 13, wherein the large pulse of power includes voltage in the 10 kV or more range and current in the 150 kA or more range.

* * * * *

UNITED STATES PATENT AND TRADEMARK OFFICE

CERTIFICATE OF CORRECTION

PATENT NO. : 8,593,790 B2
APPLICATION NO. : 13/222405
DATED : November 26, 2013
INVENTOR(S) : Randall J. Appleton et al.

It is certified that error appears in the above-identified patent and that said Letters Patent is hereby corrected as shown below:

In the Specification:

Column 2, Line 33
Insert the word --the-- between the words "plurality" and "contact" so the line reads "...a plurality of contact plates...".

In the Claims:

Column 8, Line 53
Delete the word "design" and replace it with the word --designed--.

Signed and Sealed this
Nineteenth Day of August, 2014

Michelle K. Lee

Michelle K. Lee
*Deputy Director of the United States Patent and Trademark Office*